(12) United States Patent
Chandhok et al.

(10) Patent No.: US 7,958,252 B2
(45) Date of Patent: Jun. 7, 2011

(54) SYSTEM FOR SCALABLE TRANSMISSION OF CONTENT IN A DATA NETWORK

(75) Inventors: Ravinder Chandhok, Poway, CA (US);
An Mei Chen, San Diego, CA (US);
Thadi Nagaraj, San Diego, CA (US);
Yixin Zhu, Plano, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1037 days.

(21) Appl. No.: 11/120,580

(22) Filed: May 2, 2005

(65) Prior Publication Data

US 2005/0251838 A1 Nov. 10, 2005

Related U.S. Application Data

(60) Provisional application No. 60/568,327, filed on May 4, 2004.

(51) Int. Cl.
*G06F 15/16* (2006.01)
(52) U.S. Cl. ....................................................... 709/231
(58) Field of Classification Search .................. 709/231
See application file for complete search history.

(56) References Cited

U.S. PATENT DOCUMENTS

| | | | |
|---|---|---|---|
| 6,310,881 B1 * | 10/2001 | Zikan et al. .................... | 370/401 |
| 6,343,298 B1 * | 1/2002 | Savchenko et al. .................... | 1/1 |
| 6,466,980 B1 | 10/2002 | Lumelsky et al. | |
| 6,574,195 B2 | 6/2003 | Roberts | |
| 6,640,248 B1 | 10/2003 | Jorgensen | |
| 6,724,727 B2 | 4/2004 | Counterman | |
| 6,728,300 B1 * | 4/2004 | Sarkar et al. ................... | 375/147 |
| 6,934,249 B1 * | 8/2005 | Bertin et al. .................... | 370/218 |
| 6,973,622 B1 * | 12/2005 | Rappaport et al. ............. | 715/735 |
| 6,977,957 B2 * | 12/2005 | Sarkar et al. ................... | 375/147 |
| 7,146,185 B2 * | 12/2006 | Lane ............................ | 455/552.1 |
| 7,424,708 B2 | 9/2008 | Andersson et al. | |
| 2002/0041629 A1 * | 4/2002 | Hannuksela ............. | 375/240.12 |
| 2003/0161323 A1 | 8/2003 | Harada et al. | |
| 2004/0030798 A1 * | 2/2004 | Andersson et al. ........... | 709/232 |
| 2004/0042440 A1 * | 3/2004 | McGowan ..................... | 370/345 |
| 2004/0114608 A1 * | 6/2004 | Rao et al. ....................... | 370/396 |

FOREIGN PATENT DOCUMENTS

JP 11032370 A 2/1999

(Continued)

OTHER PUBLICATIONS

"Block Code." Wikipedia. <http://en.wikipedia.org/wiki/Block_code>.*

(Continued)

*Primary Examiner* — Jeffrey Pwu
*Assistant Examiner* — Saad A Waqas
(74) *Attorney, Agent, or Firm* — Milan Patel; Gerald P. Joyce, III

(57) ABSTRACT

System for scalable transmission of content in a data network. A method is provided for transmitting a plurality of content clips. The method includes determining QoS factors for the content clips, and grouping the content clips into groups based on the determined QoS factors. The method also includes coding the content clips in the groups to form coded content clips, interleaving the coded content clips to create a clip stream, and transmitting the clip stream.

35 Claims, 4 Drawing Sheets

FOREIGN PATENT DOCUMENTS

| | | |
|---|---|---|
| JP | 11340937 A | 12/1999 |
| WO | WO 90/10343 A1 | 9/1990 |
| WO | WO 99/45668 A1 | 9/1999 |
| WO | 03049376 | 6/2003 |
| WO | 2004112372 | 12/2004 |

OTHER PUBLICATIONS

"How Forward Error-Correcting Codes Work." Archive—Aero.Org. <http://web.archive.org/web/20020511121602/http://www.aero.org/publications/crosslink/winter2002/04_sidebar1.html>.*

"Interleaving." Wikipedia. <http://en.wikipedia.org/wiki/Interleaving>.*

"Reed-Solomon Error Correction." Wikipedia. <http://en.wikipedia.org/wiki/Reed%E2%80%93Solomon_error_correction>.*

Lee et al., "An Integrated Source Coding and Congestion Control Framework for Video Streaming in the Internet," IEEE Proceedings, XP-010376164 (2000).

International Search Report, PCT/US2005/015458—International Searching Authority—European Patent Office, Sep. 22, 2005.

Written Opinion, PCT/US2005/015458—International Searching Authority—European Patent Office, Sep. 22, 2005.

International Preliminary Examination Report, PCT/US2005/015458—International Preliminary Examining Authority—US, Feb. 12, 2009.

Suzuki, et al., A Study of FEC/ARQ Hybrid Control Techniques for Reliable Multicast in Wireless Networks, Research Paper of Information Processing Society of Japan, Mar. 8, 2002, pp. 75-82, vol. 2002, No. 24, Kanagawa, Japan.

\* cited by examiner

SYSTEM FOR SCALABLE TRANSMISSION OF CONTENT IN A DATA NETWORK

CLAIM OF PRIORITY UNDER 35 U.S.C. §119

The present application for patent claims priority to Provisional Application No. 60/568,327 entitled "ALGORITHM FOR SCALABLE AND RELIABLE TRANSMISSION OF CLIPS" filed May 4, 2004 assigned to the assignee hereof and hereby expressly incorporated by reference herein.

BACKGROUND

1. Field

The present invention relates generally to content delivery in a network environment, and more particularly, to a system for scalable transmission of content in a data network.

2. Description of the Related Art

Data networks, such as wireless communication networks or the wired Internet, have to trade off between services customized for a single terminal and services broadcast/multicast to all terminals. An important problem to overcome for a number of existing and future applications is that of delivering content in a scalable and reliable manner to a large number of autonomous clients over lossy and possibly heterogeneous channels. For example, in one application, a network server transmits a video/audio clip to a number of network terminals, where the number of terminals could be on the order of hundreds or thousands. These terminals could be connected to the network via various wired and/or radio link technologies. Each receiver of the clip may experience different network congestion, channel errors, or service interruptions. Service interruptions could be caused by loss of RF coverage, receiving an incoming voice call while the clip is being transmitted, and so forth.

For each clip in the system, there is an associated deadline as to when the clip should be made available for viewing. If the clip is delivered after the expiration of the deadline, it becomes useless content. Because clips may be unicast or broadcast over a lossy channel, some reliability mechanism should be considered in order to guarantee successful delivery. However, the reliability mechanism selected should not incur excessive bandwidth resources.

One technique proposed to address these problems uses an acknowledgement-based approach. Given that multicast transmission is not prevalent, one-to-one delivery has often been utilized for sending content to a large number of receivers. In the acknowledgement-based approach, a unicast connection is established between the sender and each of the receivers. An acknowledgement-based protocol (i.e., TCP) is used to provide reliable transmission of the content. For example, the sender has to open N separate unicast TCP-like connections to N different receivers. Then, N copies of each packet have to be sent over different links, making poor use of the available bandwidth. In addition, the sender has to keep track of the status of each of the N receivers.

A variation of the acknowledgement-based approach uses multicast for the delivery mechanism. This variation is more efficient because packets need only to be replicated in the network at the point where their paths diverge. However, if an acknowledgment-based approach similar to TCP is applied to multicast distribution, a number of problems arise. First, because data packets trigger acknowledgments (positive or negative) from all receivers, the sender is subjected to the well known "acknowledgment implosion" effect. Second, if the sender is responsible for reliable delivery, it must continuously track the changing set of active receivers and the reception state of each. In IP multicast, the data is sent to the multicast group, not the set of receivers. Hence, it may be impossible for the sender to obtain the set of receivers. Third, the algorithms that are used to adapt to changing network conditions tend to lose their meaning in the case of multicast, since not all receivers share the same link. Finally, in addition to the inherent problems above, the acknowledgement-based approach requires a return path from the receivers to the sender. Unfortunately, the return path uses valuable air link resources, and as a result, this approach does not scale well when the receiving population is large.

Another technique proposed to solve the problems associated with content distribution utilizes Forward Error Correcting (FEC). In this technique, the original content is encoded to provide error protection so that the receivers can reconstruct the original content from the encoded data. This approach does not require a return path to the sender. However, when multiple content clips are to be distributed, this technique does not consider a timely delivery of the clips, nor how much error protection each clip should receive to provide a desired quality of service (QoS).

The idea behind the FEC approach is to get the transmission right the first time. In the FEC approach, the sender transmits some redundant data called parities with the original content to allow reconstruction of lost packets at the receivers. The transmission can be unicasted or broadcasted. The redundant data is derived from the original data using techniques from coding theory. For example, exclusive OR (XOR) or Reed-Solomon (RS) coding may be used.

One of the attributes of the FEC approach is that the scheme does not require a return path. The FEC transmitter sends k data packets and adds an additional h redundant parity packets. Unless the network drops more than h out of h+k packets sent, the receiver can reconstruct the original k information packets.

However, one problem associated with conventional FEC approaches is choosing the right amount of redundancy to ensure reliable transmission. Sending redundant data consumes precious transmission resources and decreases overall system throughput. In addition, choosing the wrong amount of redundancy could cause a delay in the transmission of some content. For example, in convention FEC approaches, the code blocks of a single content clip are sent all at once. A clip with a high QoS requirement will have a very low code rate. Hence, it will take a large amount of time to transmit all the code blocks for that clip. This long transmission time may unnecessarily delay the transmission of other content clips. This type of system lacks time diversity because some content clips consumer the transmission resources to the exclusion of others.

Therefore, what is needed is a scalable content transmission system for transmitting content clips to a large number of receiving terminals. The transmission system must not only consider the deadline of the clip but also the bandwidth efficiency, since the transmission may take place over precious transmission resources. In addition, the system should operate where a number of content clips are competing for the same transmission resources, and where not all the content clips need to be delivered with the same quality of service. Hence, the system should not only prioritize and schedule the transmission of the content clips to provide time diversity, but also determine how much reliability it should provide for each content clip based on individual quality of service requirements.

SUMMARY

In one or more embodiments, a scalable transmission system is provided that operates to efficiently transmit a plurality of content clips to one or more receiving terminals. In one embodiment, the system operates to prioritize and schedule the transmission of the content clips, and determine how much reliability it should provide for each content clip based on individual quality of service requirements. For example, the system operates to determine how much error protection a particular content clip should receive based on a quality of service factor associated with that clip. The content clips are grouped prior to error protection coding so that all clips in the same group receive the same level of error protection. The system operates to interleave the coded blocks of content clips from one group with coded blocks of content clips from other groups to provide better time diversity and reduce possible transmission delays. An interleaving algorithm is provided to determine a schedule of transmission for the coded blocks.

In one embodiment, a method is provided for transmitting a plurality of content clips. The method comprises determining QoS factors for the content clips, and grouping the content clips into groups based on the determined QoS factors. The method also comprises coding the content clips in the groups to form coded content clips, interleaving the coded content clips to create a clip stream, and transmitting the clip stream.

In one embodiment, apparatus is provided for transmitting a plurality of content clips. The apparatus comprises processing logic that operates to determine QoS factors for the content clips and group the content clips into groups based on the determined QoS factors. The apparatus also comprises coding logic to code the content clips in the groups to form coded content clips and interleaving logic to interleave the coded content clips to create a clip stream. The apparatus also comprises transmitting logic to transmit the clip stream.

In one embodiment, apparatus is provided for transmitting a plurality of content clips. The apparatus comprises means for determining QoS factors for the content clips and means for grouping the content clips into groups based on the determined QoS factors. The apparatus also comprises means for coding the content clips in the groups to form coded content clips, and means for interleaving the coded content clips to create a clip stream. The apparatus also comprises means for transmitting the clip stream.

In one embodiment, a computer-readable media is provided comprising instructions, which when executed by processing logic in a server, operate to transmit a plurality of content clips. The computer-readable media comprises instructions for determining QoS factors for the content clips, and instructions for grouping the content clips into groups based on the determined QoS factors. The computer-readable media also comprises instructions for coding the content clips in the groups to form coded content clips, and instructions for interleaving the coded content clips to create a clip stream. The computer-readable media also comprises instructions for transmitting the clip stream.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes embodiments of a scalable content transmission system that operate to efficiently deliver content from a transmitting server to a large number of terminals. The system is suitable for use in any type of wired or wireless network, including but not limited to, communication networks, public networks, such as the Internet, private networks, such as virtual private networks (VPN), local area networks, wide area networks, long haul network, or any other type of data network.

In one or more embodiments, the system utilizes a FEC approach to deliver content to a large number of terminals over one or more transmission channels without requiring the use of a return path. However, in practice, not all content distributed by the system requires an equal amount of error protection. For example, one clip with little value may need no FEC or FEC with a very high code rate. On the other hand, another clip having a high value may require more protection. In one embodiment, values are associated with the importance of each clip based on factors such as its information content or the number of terminals (users) demanding the clip. Thus, in one or more embodiments, the encoding rate is a function of not only the transmission channel characteristics but also based on the quality of service that the system is willing to provide to that particular content. Therefore, the amount of error protection that a clip gets will depend on its QoS factor. By utilizing the QoS factor to determine encoding rates, the system achieves improved system throughput with some guarantee of QoS for the clips that need to be delivered.

In one or more embodiments, the system provides time diversity by interleaving code blocks of one clip with code blocks from other clips, where the clip can be completely decoded from each block size. Thus, under desirable channel conditions with no service interruptions, the receiving terminal can reconstruct the complete clip after the reception of the first code block.

Figure 1:
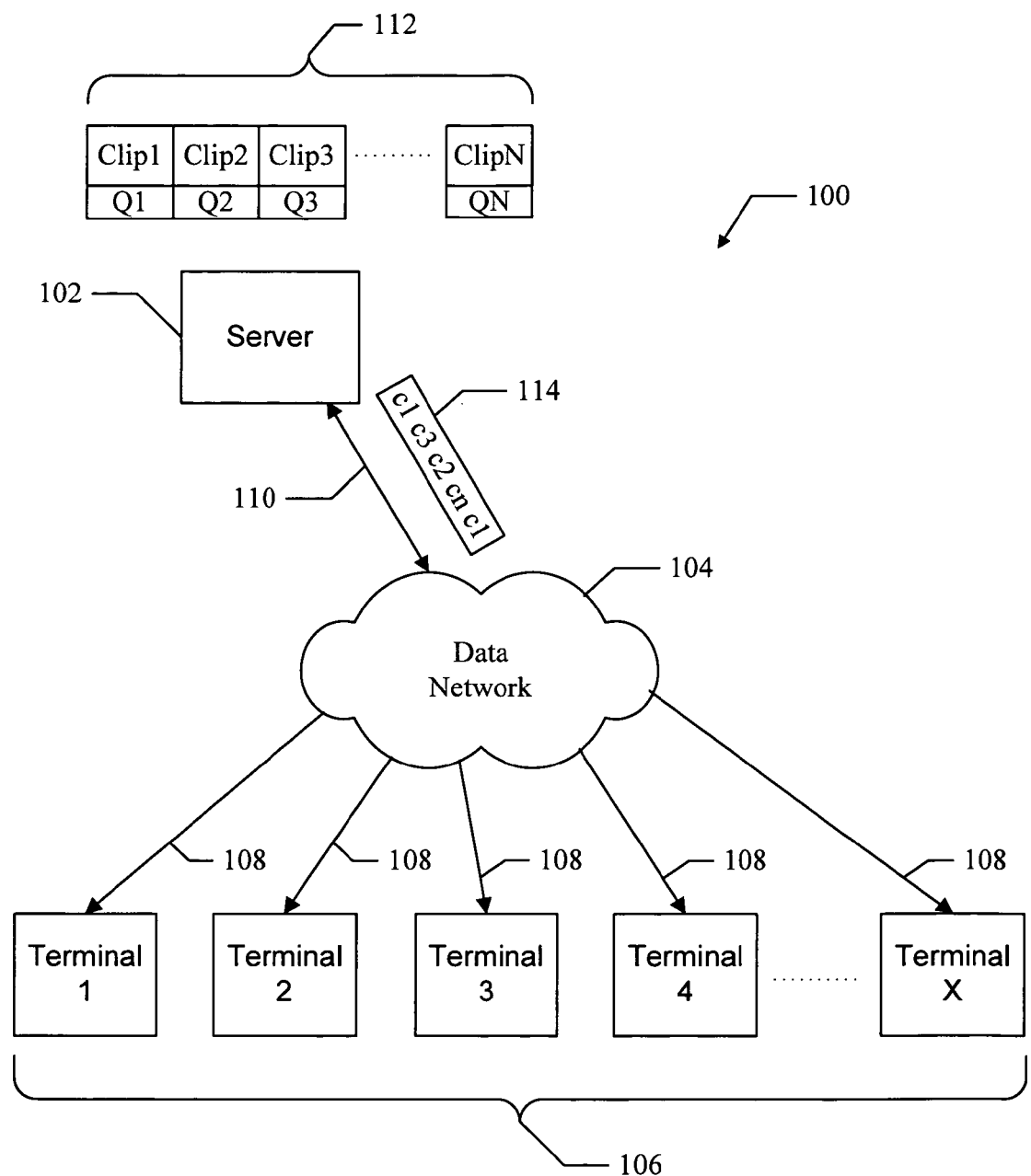
FIG. 1 shows a network that comprises one embodiment of a scalable content transmission system.

FIG. 1 shows a data network 100 that includes one embodiment of a scalable content transmission system. The network 100 comprises a server 102, a data network 104, and terminals (1 thru X), as shown at 106. The data network 104 may be any type of wired or wireless network that allows data to be transmitted from the server 102 to the terminals 106. Each of the terminals may be any type of receiving device that includes, but is not limited to, a portable telephone, a handheld device, a PDA, a notebook computer, desktop computer, or any other type of device capable of receiving network communications. The terminals communicate with the data network using communication channels 108, which may comprise wired or wireless communication links. For example, in one embodiment, the terminals 106 are wireless telephones that communicate with the network 104 via wireless communication channels 108.

The server 102 includes content 112 that comprises content clips 1 through N. The clips may be any type of application, program, multimedia content, or data file. During operation, a QoS factor (Q1-QN) is associated with each clip, respectively, that indicates the desire quality level with which each clip should be delivered. The server 102 also communicates with the data network via the communication channel 110, which may be any type of wired or wireless channel.

The server 102 processes the clips 112 to group them according to their QoS factors. The clips in each group are then encoded with the same level of error protection. After encoding, the clips are interleaved according an interleaving algorithm to form a clip stream 114 that is transmitted to the terminals (1-X) via the data network 104. Because the clips are encoded based on their associated QoS factor, encoding resources are not wasted by heavily encoding clips with lows QoS requirements. Also, the interleaving of the clips operates to provide time diversity and prevent the transmission of clips encoded with low rate codes from blocking the transmission of other clips.

Figure 2:
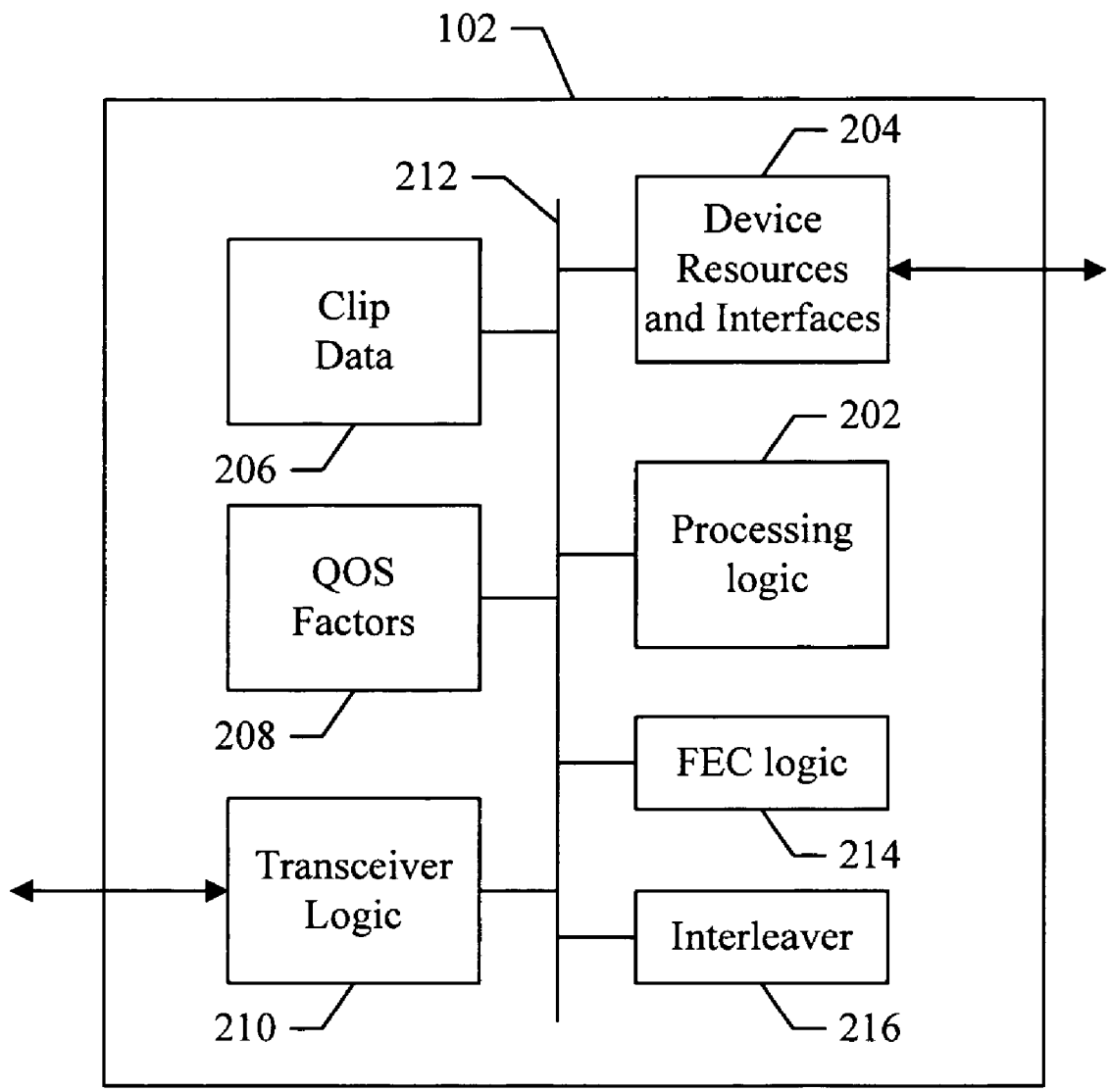
FIG. 2 shows a functional block diagram of a server for use in one embodiment of a scalable content transmission system.

FIG. 2 shows a functional block diagram of the server 102 for use in one embodiment of a content transmission system. The server 102 comprises processing logic 202, device resources and interfaces 204, content clip data 206, QoS factors 208, and transceiver logic 210, all coupled to an internal data bus 212. The server 102 also comprises FEC logic 214 and interleaver 216, which are also coupled to the data bus 212.

In one or more embodiments, the processing logic 202 comprises a CPU, processor, gate array, hardware logic, discrete logic, memory elements, virtual machine, software, and/or any combination of hardware and software. Thus, the processing logic 202 generally comprises logic to execute machine-readable instructions.

The device resources and interfaces 204 comprise hardware and/or software that allow the server 102 to communicate with internal and external systems. For example, internal systems may include mass storage systems, memory, display drivers, modems, or other internal device resources. The external systems may include user interface devices, printers, disk drives, or other local devices or systems.

The content clip data 206 represents content to be transmitted over a network to one or more receiving terminals. For example, the clip data 206 may comprise multimedia content, applications, or data in any format and stored on any type of memory device.

The transceiver logic 210 comprises hardware and/or software that operates to allow the server 102 to transmit and receive data and other information to/from external devices or systems. For example, the transceiver logic 210 may comprise logic to transmit data and/or other information over a data network to other devices, such as receiving terminals 106 shown in FIG. 1. For example, the server 102 may use the transceiver logic 210 to transmit a multicast transmission over a data network to a plurality of receiving terminals.

The FEC logic 214 comprises any combination of hardware and software and operates to encode the clip data 206 using any type of coding technique so that each clip may be delivered with a selected QoS level at a receiving terminal. For example, the FEC logic 214 may use XOR or Reed Solomon coding to encode the clip data 206.

The Interleaver 216 comprises any combination of hardware and software and operates to interleave coded content clips based on an interleaving algorithm. For example, in one embodiment, an interleaving algorithm is provided to allow less valuable content clips to be interleaved with more valuable content clips to provide time diversity to allow the low value clips to be delivered.

During operation of the server 102, the processing logic 202 operates to process content clips in the clip data 206 to determine QoS factors for each clip that are stored at QoS factors 208. The QoS factors are determined from various delivery parameters associated with each clip that are described in more detail in another section of this document.

Once the QoS factors are determined, the processing logic 202 operates to group the clips by their QoS factors and then activates the FEC logic 214 to encode the clips in each group using any suitable FEC coding technique. In one embodiment, all clips in one group are encoded with the same level of error protection. For example, a group containing valuable content clips would be coded using a lower rate code than a group containing less valuable content clips.

After all groups have been encoded, the processing logic 202 activates the interleaver 216 to interleave the code blocks from coded clips in all groups. Thus, the interleaver 216 forms a coded clip stream for transmission from the sever 102 to the receiving terminals. The clip stream is transmitted by the transceiver logic 210. The clip stream generated by the interleaver 216 provides time diversity because clips of higher value are interleaved with clips of lower value.

In one embodiment, the content transmission system comprises program instructions stored on a computer-readable media, which when executed by the processing logic 202, provides the functions of the server 102 described herein. For example, instructions may be loaded into the server 102 from a computer-readable media, such as a floppy disk, CDROM, memory card, FLASH memory device, RAM, ROM, or any other type of memory device or computer-readable media that interfaces to the server 102 via the device resources 204. In another embodiment, the instructions may be downloaded into the server 102 from a network resource that interfaces to the sever 102 via the transceiver logic 210. The instructions are stored in a computer-readable media at the processing logic 202, and when executed by the processing logic 202, provide one or more embodiments of a scalable content transmission system as described herein.

In one or more embodiments, the system operates to scalably transmit content clips to one or more receiving terminals by performing the following steps.
 1. A QoS factor for each clip is computed.
 2. The clips are grouped based on the QoS factors. These groups are called encoding groups.
 3. An encoding factor for each group is computed. This will guide how much error protection clips from each encoding group will receive.
 4. The clips are encoded based on the encoding factors
 5. The coded clips are interleaved to produce a content clip stream that achieves both time diversity and meets selected QoS requirements.
 6. The resulting content clip stream is transmitted to the receiving terminals.

Computing the Quality of Service (QoS) Factor

The following describes how in one embodiment, the processing logic 202 operates to compute QoS factors 208. Assuming the server 102 has m clips in the clip data 206 that need to be delivered from the server 102 to a number of receiving terminals, where the clips are denoted as $A_1$, $A_2, \ldots, A_m$. For each clip, there is a demand probability $p_i$, such that $$\sum_{i=1}^{m} p_i = 1.$$

In one embodiment, the number $p_i$ represents the percentage of receiving terminals (users) in the system desiring to have clip i, or in another embodiment, it could represent the relative importance of the clip i.

For the following discussion, it will be assumed that $l_i$ and $d_i$ are the size and the delivery latency of the clip i, respectively. The delivery latency is defined as the time between the arrival of the clip i at the distribution center of a clip (i.e., transmitting server 102) and the promised viewing time of the clip at the receiving terminal. Thus, a QoS factor $v_i$ is defined by normalizing the demand probability $p_i$ by the size of clip i and its delivery latency $d_i$, so that;

$$v_i \propto \sqrt{\frac{p_i}{l_i F_i(d_i)}}$$

where $F_i(x)$ is an increasing function of x. Thus, in one embodiment, the system operates to use the above formulas to compute QoS factors for each clip in the clip data 206, which are then stored as QoS factors 208.

Partitioning Clips into Encoding Groups

The following describes how in one embodiment, the processing logic 202 operates to partition clips into encoding groups. The processing logic 202 orders the clips by their QoS factor $v_i$, $i \in \{1, 2, \ldots, m\}$ starting from the highest value factor to the lowest value factor. The clips are then partitioned into groups, where each group contains clips with similar or substantially the same QoS factors. For example, clips having QoS factors within ten percent of each other are placed in the same group. These groups are called encoding groups, and all the clips within a particular encoding group will get the same error protection. For example, the same FEC rate coding is used for all clips in a particular encoding group. In one or more embodiments, it is possible to use any technique or threshold value to partition the clips into encoding groups.

Determining the Encoding Factor

The following describes how in one embodiment, the processing logic 202 operates to determine the amount of encoding that will be provided for each clip in an encoding group. The amount of error protection that a particular clip receives is depended on what encoding group it belongs to. In one embodiment, the processing logic 202 computes an encoding factor as follows:

1. Assume $G_j$ is the Encoding Group j and its corresponding encoding factor is $e_j$, where $j \leq m$.
2. Choose the encoding factor $e_j$ for $G_j$ such that:

$$e_j \propto \sqrt{\frac{\bar{p}_j}{\bar{l}_j F_j(\bar{d}_j)}},$$

where $\bar{p}_j$, $\bar{l}_j$ and $\bar{d}_j$ are the average demand factor, average size, and average delivery latency of the content items within $G_j$ respectively, and where $$\bar{p}_j = \frac{1}{n_j} \sum_{k=1}^{n_j} p_k, \bar{l}_j = \frac{1}{n_j} \sum_{k=1}^{n_j} l_k \text{ and } \bar{d}_j = \frac{1}{n_j} \sum_{k=1}^{n_j} d_k$$

and $n_j$ represents the number of content items in $G_j$.

For example, if there are two encoding groups; the first encoding group may be coded to three times the clip size, while the second encoding group may be coded to two times the clip size. In one embodiment, clips within each encoding group are ranked based on their Earliest Due Date (EDD) for transmission.

Once the processing logic 202 determines the amount of encoding to be provided for each clip, the processing logic 202 controls the FEC logic 214 to encode the clips accordingly.

Determining the Interleaving Pattern

The following describes how in one embodiment, the processing logic 202 operates to control the interleaver 216 to interleave the code blocks from one clip with code blocks from one or more other clips. This overcomes the potential for Head of the Line (HOL) blocking that may occur in conventional FEC approaches. For example, conventional FEC approaches send all the encoded data for a clip at once, so that a valuable clip that has low rate coding will block or delay the transmission of less valuable clips.

In one or more embodiments of the content transmission system, the code block can completely decode the original information item. If the first code block is received without any error, then the information reception for that particular content clip is completed. The next code block to be sent will be from a different content clip. Interleaving the code blocks provides time diversity and allows code blocks with higher coding rates to be transmitted. Thus, if the receiver is interrupted while receiving the first code block of a content clip, the receiver can wait until the transmission of the next code block. At the next code block, the receiver only needs to receive enough code information to reconstruct the original content clip. For example, in Reed Solomon coding, the receiver only needs to receive any k out of n code blocks to reconstruct the original information of k size, while in Luby transform coding, the receiver needs to receive k+ϵ code blocks to reconstruct the original information of k size, given that ϵ is a very small value.

In one embodiment, the interleaving pattern is dictated by the coding factor, which is derived from the QoS factor of the content clip. If the content clip is valuable, then the code block will be transmitted more often and closer in time than that of less valuable content clips.

In one embodiment, the processing logic 202 performs the following functions to determine the interleaving pattern. A Code Block Cycle (CBC) is first computed. The CBC is the Least Common Multiple (LCM) of the encoding factors of the groups to be transmitted. For example, if there are two encoding groups with encoding factors of 2 and 3, respectively, the CBC is 6.

In one or more embodiments, an interleaving pattern is derived using the following algorithm;

```
For i = 0 to CBC-1;
    For j = 1 to number of code groups;
        k = i mod Ni;
        Transmit code block k of group j;
    End;
End;
``` where Ni denotes the number of interleaving units in a code group and can be computed as follows:

$$N_i = \left\lceil \frac{CBC}{LCM/e_i} \right\rceil$$

Thus, the processing logic 202 performs the above algorithms to interleave the coded blocks from the encoding groups to form a stream of coded blocks that are transmitted from the server 102 to the receiving terminals.

Figure 3:
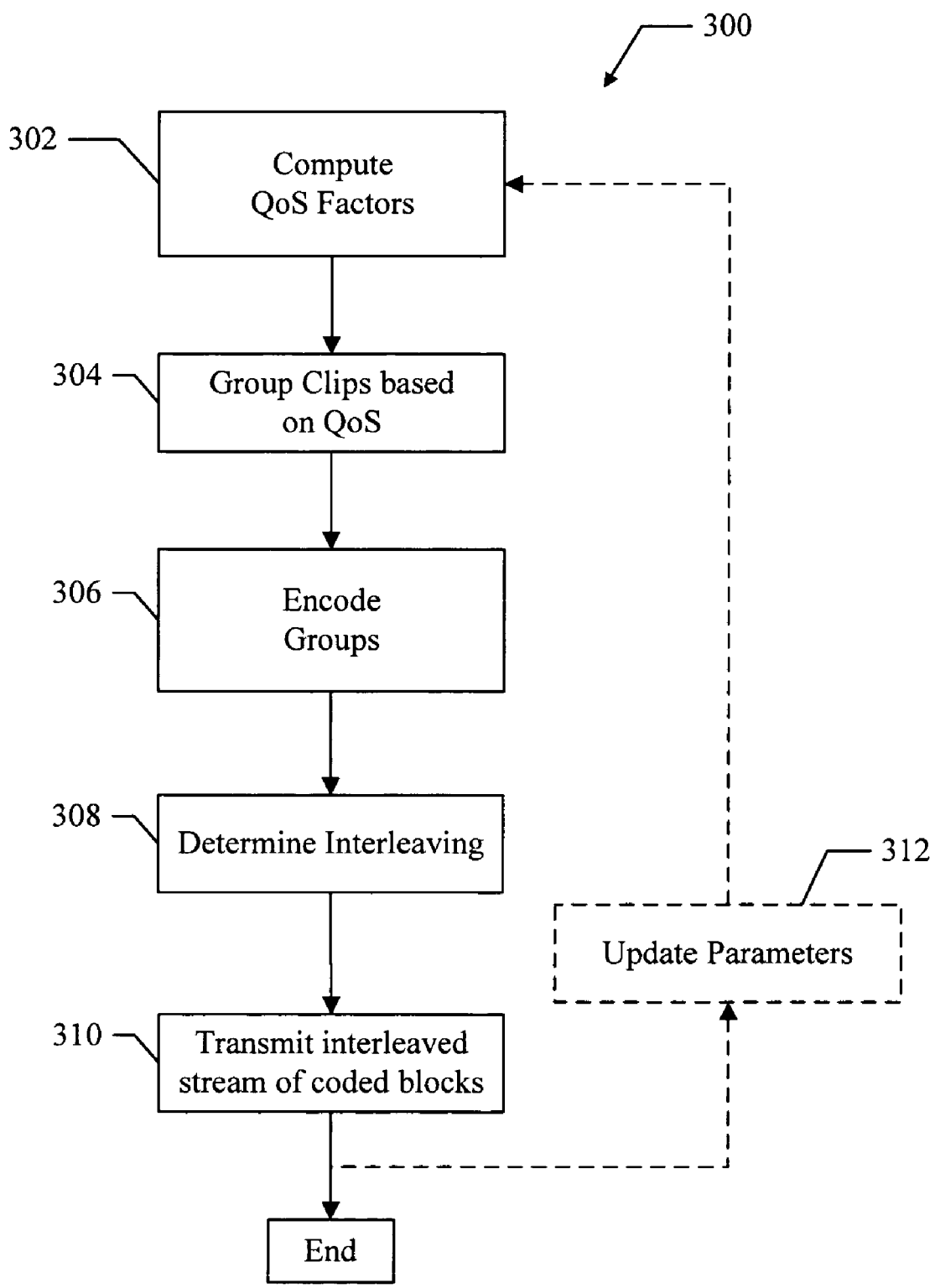
FIG. 3 shows one embodiment of a method for operating the server of FIG. 2.

FIG. 3 shows a method 300 that illustrates the operation of one embodiment of a scalable content transmission system. For clarity, the method 300 will be described with reference to the server 102 shown in FIG. 2, and it will be assumed that the clip data 206 comprises a number of content clips to be transmitted to one or more receiving terminals. In one or more embodiments, the processing logic 202 executes program instructions stored on computer-readable media to perform the functions described below.

At block 302, QoS factors are computed for each content clip to be transmitted. For example, the processing logic 202 computes the QoS factors 208 for each of the content clips in the clip data 206. In one embodiment, the QoS factors are computed using techniques describe above.

At block 304, the content clips are grouped according to their QoS factors. For example, the processing logic 202 operates to group the clips in the clip data 206 by the QoS factors 208 determined in the preceding step. In one embodiment, the clips are grouped together so that clips having approximately the same QoS factor are placed in the same group.

At block 306, the groups of content clips are encoded using any suitable FEC encoding technique. For example, the processing logic 202 activates the FEC logic 214 to encode clips in each QoS group by a selected encoding factor. For example, in one embodiment, groups associated with higher QoS factors are encoded with a lower rate code than groups associated with lower QoS factors.

At block 308, the coded content blocks are interleaved to create a stream of coded blocks that represent the content clips. For example, the processing logic 202 activates the interleaver 216 to interleave the coded blocks in the encoding groups to form an interleaved stream of coded blocks that represent the content clips. The interleaver 216 uses the above-described interleaving algorithm to interleave the coded blocks.

At block 310, the interleaved stream of coded block (clip stream) that represent the content clips are transmitted over the network to the receiving terminals. For example, the interleaver 216 outputs the interleaved stream to the transceiver 210, which in turn, operates to transmit the interleaved stream over the data network.

At block 312, an optional step is performed where system parameters are updated and the method is repeated to determine a new clip stream for transmission. For example, in one or more embodiments, the system operates to adjust or change the transmitted clip stream based on new or updated information. For example, in one embodiment, as time passes, the relative values of the clips change so that the value of any particular clip may increase or decrease. Based on this change, the system operates to update the computed QoS requirements for the content clips. Thus, the QoS requirements may change over time, so that after a selected time interval has expired, the QoS requirements for the content clips may be recomputed by proceeding to block 302. Once the QoS new requirements are determined, the processes of grouping, coding, and interleaving (304, 306, 308) are also performed again to form a new clip stream for transmission at block 310. Thus, in one or more embodiments, it is possible for any or all of the described parameters to be recomputed (at periodic or randomly intervals) to form a new clip stream for transmission. Therefore, embodiments of the scalable content transmission system operate to adapt to any type of changing condition, such as QoS requirements, coding requirements, interleaving requirements, and/or changing network conditions to efficiently transmit a plurality of content clips to one or more receiving terminals.

It should be noted that the method 300 illustrates just one embodiment and that changes, additions, or rearrangements of the method steps may be made without deviating from the scope of the various embodiments.

Illustrated Example

The following section provides an example that illustrates how one or more embodiments of a scalable content transmission system operate to provide reliable delivery of content to a large number of receiving terminals.

Figure 4:
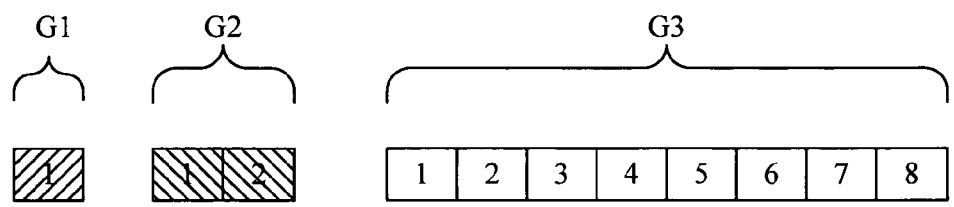
FIG. 4 shows a diagram illustrating an example of the operation of one embodiment of a scalable content transmission system.
Figure 4:
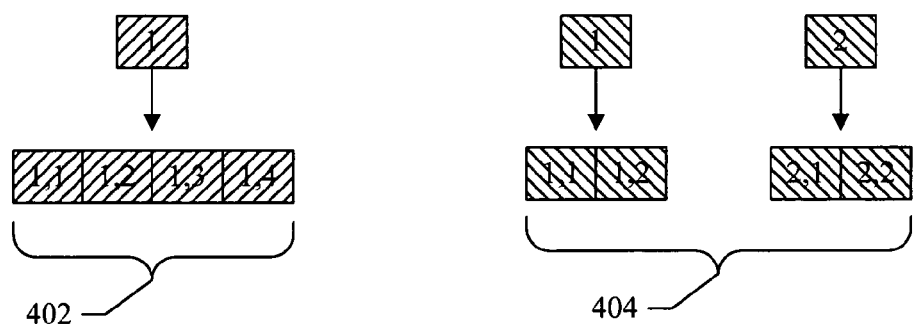
Figure 4:
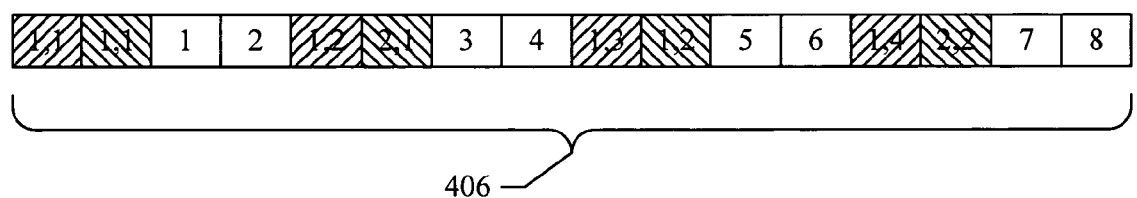

FIG. 4 illustrates the operation of one embodiment of a scalable content transmission system. In this example, the content transmission system has eleven content clips that need to be transmitted to receiving terminals. For example, the content clips may be stored in the clip data 206 shown in FIG. 2. The processing logic 202 operates to determine QoS factors for each clip and the clips are sorted and grouped into encoding groups according to the above-described embodiments. For example, it will be assumed that based on their QoS factors, the clips are sorted and grouped into three encoding groups (G1, G2, and G3) as follows.

Assuming $$\frac{\overline{v_1}}{\overline{l_1}} = 4\frac{\overline{v_2}}{\overline{l_2}} = 16\frac{\overline{v_3}}{\overline{l_3}},$$

then the encoding factors for each group are $e_1=4$, $e_2=2$ and the encoding factor of the lowest QoS group is $e_3=1$. Assume that $l_j^i$ is the size of clip i belonging to encoding grouping $G_j$. Based on the determined encoding factors, the clip in G1 will be encoded 4 times its original size, which is shown at 402. The two clips belonging to group G2 will get coded at twice their original size, as shown at 404. Content clips belonging to group G3 will get no encoding and will remain at their original size.

The system then operates to determine the interleaving pattern to form a clip stream, which is then transmitted to the receiving terminals. The interleaving pattern is generated according to the above-described embodiments, which results in a clip stream that is pictorially shown by the clip stream 406. As shown by the clip stream 406, the determined interleaving pattern results in a clip stream that provides time diversity, since blocks from all the encoding groups (G1, G2, G3) are periodically transmitted.

Accordingly, while one or more embodiments of a scalable content transmission system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for transmitting a plurality of m content clips from a computing device on a data network, the method comprising:

determining in the computing device a QoS factor v for each content clip i for i=1 to m according to the equation:

$$v_i \propto \sqrt{\frac{p_i}{l_i F_i(d_i)}},$$

wherein $p_i$ is a demand probability, $l_i$ is a clip size, $d_i$ is a delivery latency and $F_i(d_i)$ is a function of the delivery latency;

grouping in the computing device the content clips into groups based on the determined QoS factors;

coding in the computing device the content clips in the groups to form coded blocks of content clips;

interleaving the coded blocks of content clips to create a clip stream in the computing device, wherein the interleaving comprises interleaving coded blocks of content clips from the different groups based on the QoS factors; and transmitting the clip stream from the computing device.

2. The method of claim 1, wherein the step of determining the QoS factors comprises determining the QoS factors based on the demand probability $p_i$, wherein $$\sum_{i=1}^{m} p_i = 1.$$

3. The method of claim 1, wherein the step of grouping comprises grouping the content clips so that each group comprises content clips having QoS factors within ten percent of each other.

4. The method of claim 1, wherein the step of coding the content clips comprises coding the content clips in the groups to form coded blocks of content clips wherein the content clips within each group receive the same amount of coding.

5. The method of claim 1, wherein the step of transmitting comprises transmitting the clip stream using any combination of unicast, broadcast, and multicast transmission techniques.

6. The method of claim 1, wherein the one or more receiving terminals comprise wireless devices.

7. Apparatus for transmitting a plurality of m content clips, the apparatus comprising:

processing logic that operates to determine a QoS factor v for each content clip i for i=1 to m according to the equation:

$$v_i \propto \sqrt{\frac{p_i}{l_i F_i(d_i)}},$$

wherein $p_i$ is a demand probability, $l_i$ is a clip size, $d_i$ is a delivery latency and $F_i(d_i)$ is a function of the delivery latency; and group the content clips into groups based on the determined QoS factors;

coding logic to code the content clips in the groups to form coded blocks of content clips;

interleaving logic to interleave the coded blocks of content clips to create a clip stream, wherein the interleaving comprises interleaving coded blocks of content clips from the different groups based on the QoS factors; and transmitting logic to transmit the clip stream.

8. The apparatus of claim 7, wherein the processing logic operates to determine the QoS factors based on the demand probability $p_i$, wherein $$\sum_{i=1}^{m} p_i = 1.$$

9. The apparatus of claim 7, wherein the processing logic operates to group the content clips so that each group comprises content clips having QoS factors within ten percent of each other.

10. The apparatus of claim 7, wherein the coding logic operates to code the content clips in the groups to form coded blocks of content clips wherein the content clips within each group receive the same amount of coding.

11. The apparatus of claim 7, wherein the transmitting logic comprises logic to transmit the clip stream using any combination of unicast, broadcast, and multicast transmission techniques.

12. The apparatus of claim 7, wherein the one or more receiving terminals comprise wireless devices.

13. Apparatus for transmitting a plurality of m content clips, the apparatus comprising:

means for determining a QoS factor v for each content clip i for i=1 to m according to the equation:

$$v_i \propto \sqrt{\frac{p_i}{l_i F_i(d_i)}},$$

wherein $p_i$ is a demand probability, $l_i$ is a clip size, $d_i$ is a delivery latency and $F_i(d_i)$ is a function of the delivery latency;

means for grouping the content clips into groups based on the determined QoS factors;

means for coding the content clips in the groups to form coded blocks of content clips;

means for interleaving the coded blocks of content clips to create a clip stream, wherein the interleaving comprises interleaving coded blocks of content clips from the different groups based on the QoS factors; and means for transmitting the clip stream.

14. The apparatus of claim 13, wherein the means for determining the QoS factors comprises means for determining the QoS factors based on the demand probability $p_i$, wherein $$\sum_{i=1}^{m} p_i = 1.$$

15. The apparatus of claim 13, wherein the means for grouping comprises mean for grouping the content clips so that each group comprises content clips having QoS factors within ten percent of each other.

16. The apparatus of claim 13, wherein the means for coding the content clips comprises means for coding the content clips in the groups to form coded blocks of content clips wherein the content clips within each group receive the same amount of coding.

17. The apparatus of claim 13, wherein the means for transmitting comprises means for transmitting the clip stream using any combination of unicast, broadcast, and multicast transmission techniques.

18. The apparatus of claim 13, wherein the one or more receiving terminals comprise wireless devices.

19. A non-transitory computer-readable media comprising instructions, which when executed by processing logic in a server, operate to transmit a plurality of m content clips, the computer-readable media comprising:

instructions for determining a QoS factor v for each content clip i for i=1 to m according to the equation:

$$v_i \propto \sqrt{\frac{p_i}{l_i F_i(d_i)}},$$

wherein $p_i$ is a demand probability, $l_i$ is a clip size, $d_i$ is a delivery latency and $F_i(d_i)$ is a function of the delivery latency;

instructions for grouping the content clips into groups based on the determined QoS factors;

instructions for coding the content clips in the groups to form coded blocks of content clips;

instructions for interleaving the coded blocks of content clips to create a clip stream, wherein the interleaving comprises interleaving coded blocks of content clips from the different groups based on the QoS factors; and instructions for transmitting the clip stream.

20. The non-transitory computer-readable media of claim 19, wherein the instructions for determining the QoS factors comprise instructions for determining the QoS factors based on the demand probability $p_i$, $$\sum_{i=1}^{m} p_i = 1.$$

21. The non-transitory computer-readable media of claim 19, wherein the instructions for grouping comprise instructions for grouping the content clips so that each group comprises content clips having QoS factors within ten percent of each other.

22. The non-transitory computer-readable media of claim 19, wherein the instructions for coding the content clips comprise instructions for coding the content clips in the groups to form coded blocks of content clips wherein the content clips within each group receive the same amount of coding.

23. The non-transitory computer-readable media of claim 19, wherein the instructions for transmitting comprise instructions for transmitting the clip stream using any combination of unicast, broadcast, and multicast transmission techniques.

24. The non-transitory computer-readable media of claim 19, wherein the one or more receiving terminals comprise wireless devices.

25. A processor comprising coding logic and interleaving logic for transmitting a plurality of m content clips, the processor operable to perform a method comprising:

determining a QoS factor v for each content clip i for i=1 to m according to the equation:

$$v_i \propto \sqrt{\frac{p_i}{l_i F_i(d_i)}},$$

wherein $p_i$; is a demand probability, $l_i$ is a clip size, $d_i$ is a delivery latency and $F_i(d_i)$ is a function of the delivery latency;

grouping the content clips into groups based on the determined QoS factors; coding the content clips in the groups to form coded blocks of content clips;

interleaving the coded blocks of content clips to create a clip stream, wherein the interleaving comprises interleaving coded blocks of content clips from the different groups based on the QoS factors; and transmitting the clip stream.

26. The processor of claim 25, wherein the step of determining the QoS factors comprises determining the QoS factors based on the demand probability $p_i$, wherein $$\sum_{i=1}^{m} p_i = 1.$$

27. The processor of claim 25, wherein the step of grouping comprises grouping the content clips so that each group comprises content clips having QoS factors within ten percent of each other.

28. The processor of claim 25, wherein the step of coding the content clips comprises coding the content clips in the groups to form coded blocks of content clips wherein the content clips within each group receive the same amount of coding.

29. The processor of claim 25, wherein the step of transmitting comprises transmitting the clip stream using any combination of unicast, broadcast, and multicast transmission techniques.

30. The processor of claim 25, wherein the one or more receiving terminals comprise wireless devices.

31. The method of claim 2, wherein coding in the computing device the content clips in the groups to form coded blocks of content clips further comprises coding the content clips into a number of encoding groups $G_j$ and, for j=1 to the number of encoding groups $G_j$, determining an encoding factor $e_j$ for each encoding group $G_j$, where $j \leq m$, such that:

$$e_j \propto \sqrt{\frac{\overline{p}_j}{\overline{l}_j F_j(\overline{d}_j)}}$$

wherein $\overline{p}_j$ is an average probability demand, $\overline{l}_j$ is an average size and $\overline{d}_j$ is an average delivery latency of the content clips in $G_j$.

32. The apparatus of claim 8, wherein the coding logic to code the content clips in the groups to form coded blocks of content clips further comprises coding the content clips into a number of encoding groups G and, for j=1 to the number of encoding groups $G_j$, determining an encoding factor e~ for each encoding group G3, where $j \leq m$, such that:

$$e_j \propto \sqrt{\frac{\overline{p}_j}{\overline{l}_j F_j(\overline{d}_j)}}$$

wherein $\overline{p}_j$ is an average probability demand, $\overline{l}_j$ is an average size and $\overline{d}_j$ is an average delivery latency of the content clips in $G_j$.

33. The apparatus of claim 14, wherein the means for coding the content clips in the groups to form coded blocks of content clips further comprises coding the content clips into a number of encoding groups G and, for i=1 to the number of encoding groups $G_j$, determining an encoding factor $e_j$ for each encoding group $G_j$, where $j \leq m$, such that:

$$e_j \propto \sqrt{\frac{\overline{p}_j}{\overline{l}_j F_j(\overline{d}_j)}}$$

wherein $\overline{p}_j$ is an average probability demand, $\overline{l}_j$ is an average size and $\overline{d}_j$ is an average delivery latency of the content clips in $G_j$.

34. The non-transitory computer-readable media of claim 20, wherein the instructions for coding the content clips in the groups to form coded blocks of content clips further comprises instructions for coding the content clips into a number of encoding groups G and, for j=1 to the number of encoding groups $G_j$, determining an encoding factor e1 for each encoding group $G_j$ where $j \leq m$, such that:

$$e_j \propto \sqrt{\frac{\overline{p}_j}{\overline{l}_j F_j(\overline{d}_j)}}$$

wherein $\overline{p}_j$ is an average probability demand, $\overline{l}_j$ is an average size and $\overline{d}_j$ is an average delivery latency of the content clips in $G_j$.

35. The processor of claim 26, wherein the step of coding the content clips in the groups to form coded blocks of content clips further comprises coding the content clips into a number of encoding groups G and, for i=1 to the number of encoding groups $G_j$, determining an encoding factor $e_j$ for each encoding group $G_j$ where $j \leq m$, such that:

$$e_j \propto \sqrt{\frac{\overline{p}_j}{\overline{l}_j F_j(\overline{d}_j)}}$$

wherein $\overline{p}_j$ is an average probability demand, $\overline{l}_j$ is an average size and $\overline{d}_j$ is an average delivery latency of the content clips in $G_j$.

* * * * *